US008649520B2

(12) United States Patent
McGough

(10) Patent No.: US 8,649,520 B2
(45) Date of Patent: *Feb. 11, 2014

(54) METHOD AND SYSTEM FOR ESTABLISHING REAL-TIME TRUST IN A PUBLIC NETWORK

(76) Inventor: R. Paul McGough, Nokesville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,253

(22) Filed: Mar. 26, 2012

(65) Prior Publication Data

US 2012/0260087 A1    Oct. 11, 2012

Related U.S. Application Data

(63) Continuation-in-part of application No. 11/899,741, filed on Sep. 6, 2007, now Pat. No. 8,144,874, and a continuation-in-part of application No. 11/899,742, filed on Sep. 6, 2007, now Pat. No. 8,144,875.

(60) Provisional application No. 60/842,595, filed on Sep. 6, 2006.

(51) Int. Cl.
*H04L 29/06* (2006.01)

(52) U.S. Cl.
USPC ........... 380/264; 380/277; 713/155; 713/171; 726/1

(58) Field of Classification Search
USPC ........................................................ 713/155
See application file for complete search history.

(56) References Cited

U.S. PATENT DOCUMENTS

| 6,041,123 | A  | * | 3/2000 | Colvin, Sr. | 713/153 |
| 2002/0152175 | A1 | * | 10/2002 | Armstrong et al. | 705/64 |
| 2008/0313464 | A1 | * | 12/2008 | Fascenda et al. | 713/171 |
| 2009/0157658 | A1 | * | 6/2009 | Bonev et al. | 707/5 |

* cited by examiner

*Primary Examiner* — Hadi Armouche
*Assistant Examiner* — Bryan Wright
(74) *Attorney, Agent, or Firm* — Michael P. Fortkort, Esq.; Michael P Fortkort PC

(57) ABSTRACT

An authentication method sends an open request to a common directory server for a first key, the first key being a trusted embedded authentication common directory service key wrapped in a public key of a public-private key pair. The open request includes an authentication request value that identifies the open request as a verified setup directory service, the public key, an email address and a specified third additional out-of-band communication channel. The common directory server sends a first reply directly back to the directory server with a first half of the first key offset by a unique value and wrapped using the public key. A second reply is sent to the email address, which includes a second half of the first key offset by the first half of the first key. A third reply is sent to the specified third additional out-of-band channel, which includes the unique value.

16 Claims, 2 Drawing Sheets

Verified CDS Set Up (VSU-CDS)

METHOD AND SYSTEM FOR ESTABLISHING REAL-TIME TRUST IN A PUBLIC NETWORK

RELATED APPLICATIONS

This application claims priority to U.S. patent application Ser. No. 11/899,742 filed Sep. 6, 2007 (now U.S. Pat. No. 8,144,875), which issued Mar. 27, 2012 and is entitled "Method and System for Establishing Real-Time Authenticated and Secured Communications Channels in a Public Network", which application in turn claimed the benefit of U.S. Provisional Application No. 60/842,595 filed Sep. 6, 2006—all of which applications were filed by the same inventor.

This application also claims priority to U.S. patent application Ser. No. 11/899,741 filed Sep. 6, 2007 now U.S. Pat. No. 8,144,874 which issued Mar. 27, 2012 and is entitled "Method for Obtaining Key for Use in Secure Communications Over a Network and Apparatus for Providing Same", which claimed the benefit of U.S. Provisional Application No. 60/842,595—all of which applications were filed by the same inventor.

U.S. patent application Ser. No. 11/899,741 is hereby incorporated by reference, including the drawings, as if repeated herein in its entirety. U.S. patent application Ser. No. 11/899,742 is also hereby incorporated by reference, including the drawings, as if repeated herein in its entirety. U.S. Provisional Application No. 60/842,595 is also hereby incorporated by reference, including the drawings, as if repeated herein in its entirety.

FIELD OF THE INVENTION

The present invention relates generally to systems and methods for conducting communications over networks, and more particularly to a system and method for conducting communications securely over a public network or via any communication link.

BACKGROUND OF THE INVENTION

U.S. patent application Ser. No. 11/899,741 and U.S. patent application Ser. No. 11/899,742 disclose an extension of Secure Sockets Layer (SSL) communications. The inventor terms this extension Secure Sockets Layer eXtended (SSLX).

SSLX answers the question "Why isn't all Internet traffic secure, all the time?" One process for Internet authentication and security is SSL, which is a static process based on Public Key mathematics that doesn't allow for real time transmissions because of performance; so SSLX was developed to allow for real time processing of the SSLX-EA (Embedded Authentication) methods such that the current SSL system is replaced by real-time SSLX. This covers standard traffic from those asking for information of those serving information (the INTERnet).

But what about all of the inter-Internet traffic, such as when a shopping website combs various manufacturers for pricing information and serves that to an inquirer? How would all of that information be gathered with the same authentication and security as when it is collectively served through SSL (and/or SSLX)?

The present invention is therefore directed to the problem of developing a method and apparatus for providing inter-Internet traffic with secure authentication.

SUMMARY OF THE INVENTION

The present invention solves this and other problems by developing the next-generation of the Internet, where any and all such combined/sorted/integrated information can be delivered within the real time of a request, across multiple information centers (the INTRAnet). This will enable Facebook and Twitter and AIM and email and VoIP and, well everything, to be combined into on-the-fly Real Time Trust communication from anywhere to everywhere: An Authentic and Secure Cloud.

According to one aspect of the present invention, an exemplary embodiment of a method for performing authenticated communication in a public network includes certain steps by a directory server and a common directory server to generate by the common directory server a key for use by the directory server in subsequent communications with another directory server having obtained a key in a similar manner. In this exemplary embodiment, the directory server sends an open request to the common directory server for a key, which key comprises a trusted embedded authentication common directory service key wrapped in a public key of a public-private key pair. The open request includes an authentication request value that identifies the open request as a verified setup directory server, the public key, an email address and a specified third additional out-of-band communication channel. The common directory server sends a first reply of three replies after generating the key. The first reply is sent by the common directory server directly back to the directory server with a first half of the key offset by a unique value and wrapped using the public key. The second reply of the three replies is sent by the common directory server via email to the email address. The second reply includes a second half of the key offset by the first half of the key. The common directory server sends a third reply of the three replies to the specified third additional out-of-band channel, which third reply includes the unique value.

The exemplary embodiment of the aforementioned method may include creating by the directory server the public-private key pair, which includes the public key and a private key.

The exemplary embodiment of the aforementioned method may include combining the first half of the key and the second half of the key to form the key using the offset specified by the unique value.

The exemplary embodiment of the aforementioned method may include storing the key in a predetermined location in the directory server.

The exemplary embodiment of the aforementioned method may include sending by the directory server a confirmation message wrapped in the first key to the common directory server.

The exemplary embodiment of the aforementioned method may include decrypting by the common directory server the confirmation message using the key, which confirmation message includes a sent value.

The exemplary embodiment of the aforementioned method may include sending a denied message wrapped in the public key back to the directory server by the common directory server if the sent value does not equal a value calculated by the common directory server using the first key during the decrypting.

The exemplary embodiment of the aforementioned method may include decrypting by the directory server the denied message using the public key and removing by the directory server the first key from the predetermined location in the directory server.

The exemplary embodiment of the aforementioned method may include using by the directory server the first key in all subsequent authentication handshakes through the common directory service with other directory servers having keys obtained from the common directory server in a similar manner.

In any of the exemplary embodiments herein, the specified third additional out-of-band channel may include a telephone number to which to send a computer generated voice message, a telephone number to which to send a text message, an email address to which to send an electronic message, or any social media destination address such as a specific facebook page or twitter account.

According to another aspect of the present invention, a method for performing real-time authentication between a first directory server and a second directory server can be accomplished in the following manner, if the first directory server has obtained a first key from a common directory server and the second directory server has obtained a second key from the common directory server. The first directory server sends a first request to the common directory server wrapped in the first key in an SSLX-EA communication to obtain a first directory server session master key to use in subsequent communication with the second directory server. The first request includes a first authentication request value that indicates to the common directory server with which one of a plurality of directory servers that the first directory server wishes to communicate. The first directory server session master key is generated by the common directory server. The common directory server sends a first of two replies after generating the first directory server session master key. The first reply is sent to the second directory server with the first directory server session master key wrapped in an SSLX-EA message using the second key. The second reply of the two replies is sent by the common directory server back to the first directory server with the first directory server session master key wrapped in an SSLX-EA message using the first key.

The exemplary embodiment of the aforementioned method may include wrapping all communications with the second directory server by the first directory server with the first directory server session master key in an SSLX-EA message.

The exemplary embodiment of the aforementioned method may include unwrapping all communications from the first directory server by the second directory server using the first directory server session master key.

According to yet another aspect of the present invention, an exemplary embodiment of a method for performing authenticated communication in a public network can be performed in the following manner. A first directory server sends a first open request to a common directory server for a first key. The first key comprises a trusted embedded authentication common directory service key wrapped in a first public key of a first public-private key pair of the first directory server. The first open request includes a first authentication request value that identifies the first open request as a verified setup directory service, the first public key, a first email address and a first specified third additional out-of-band communication channel. The common directory server sends to the first directory server a first reply of three replies after generating the first key. The first reply is sent directly back to the first directory server with a first half of the first key offset by a first unique value and wrapped using the first public key. The common directory server sends a second reply of the three replies via email to the first email address. The second reply includes a second half of the first key offset by the first half of the first key. The common directory server sends a third reply of the three replies to the first specified third additional out-of-band channel. The third reply includes the first unique value. The first directory server then combines the first half of the first key and the second half of the first key to form the first key using an offset specified by the first unique value. The first directory server sends a first confirmation message wrapped in the first key to the common directory server. A second directory server sends a second open request to the common directory server for a second key, which second key comprises a trusted embedded authentication common directory service key wrapped in a second public key of a second public-private key pair of the second directory server. The second open request includes a second authentication request value that identifies the second open request as a verified setup directory service, the second public key, a second email address and a second specified third additional out-of-band communication channel. The common directory server sends to the second directory server a first reply of three replies after generating the second key, which first reply is sent directly back to the second directory server with a first half of the second key offset by a second unique value and wrapped using the second public key. The common directory server sends to the second directory server a second reply of the three replies to the second directory server via email to the second email address. The second reply to the second directory server includes a second half of the second key offset by the first half of the second key. The common directory server sends a third reply of the three replies to the second directory server to the second specified third additional out-of-band channel. The third reply to the second directory server includes the second unique value. The second directory server combines the first half of the second key and the second half of the second key to form the second key using an offset specified by the second unique value. The second directory server sends a second confirmation message wrapped in the second key to the common directory server. Now, the first directory server sends a first request to the common directory server wrapped in the first key in an SSLX-EA communication to obtain a first directory server session master key to use in subsequent communication with the second directory server. The first request includes a first authentication request value that indicates to the common directory server with which one of a plurality of directory servers that the first directory server wishes to communicate. The common directory server generates the first directory server session master key and sends a first of two replies after generating the first directory server session master key. The first reply is sent to the second directory server with the first directory server session master key wrapped in an SSLX-EA message using the second key a second reply of the two replies is sent back to the first directory server with the first directory server session master key wrapped in an SSLX-EA message using the first key.

The exemplary embodiment of the aforementioned method may include wrapping all communications with the second directory server by the first directory server with the first directory server session master key in an SSLX-EA message.

The exemplary embodiment of the aforementioned method may include unwrapping all communications from the first directory server by the second directory server using the first directory server session master key.

In any of the exemplary embodiments herein, the specified third additional out-of-band channel may include a telephone number to which to send a computer generated voice message, a telephone number to which to send a text message, an email address to which to send an electronic message or any social media destination address such as a specific facebook page or twitter account.

These and other features and advantages of the present invention will become more apparent from the following description of exemplary embodiments thereof, as illustrated in the accompanying drawings.

DETAILED DESCRIPTION

U.S. Pat. Nos. 8,144,875 ("the '874 patent") and 8,144,875 ("the '875 patent") (both of which have been previously incorporated by reference in their entireties) disclose an SSLX process for the three main 'information centers' and Internet software components: Directory Service (DS), Website (Web Server) and End User (Browser). The '874 and '875 patents also disclose the methods for three specific communications that in total accomplish SSLX: A Verified Setup (VSU) between both Browsers and Web Servers with a DS; Real-Time Handshake (AH) between a Browser and a Web Server; and Normal Operation (secure routine any-direction communication) between the Browser and the Web Server.

In order to comprehensively extend SSLX within a cloud environment where numerous independent information centers will or may be a part of any on-the-fly authentic and secure communications, this present invention discloses exemplary embodiments of methods for DS to DS communications including those between the Common Directory Server (CDS) and any DS, as well as definition of the methods for SSLX Public Authority (PA) information center communications between DS to PA, Webserver to PA and Browser to PA. This completes the creation of a full Real Time Trust capability for the Internet using the CDS as a public trusted $3^{rd}$ party authority for all SSLX authentic, secure and private Internet communications between any and all Directory Services, Web Servers and Browsers, with oversight from the PA.

Communications

DS to DS communication requires the use of the Common DS in order to maintain the integrity of the existing SSLX communications. The same SSLX types of communications that exist among DS-Browser-Web Server are used in specialized format between a DS the CDS and another DS.

VSU-CDS

Operation

Figure 1:
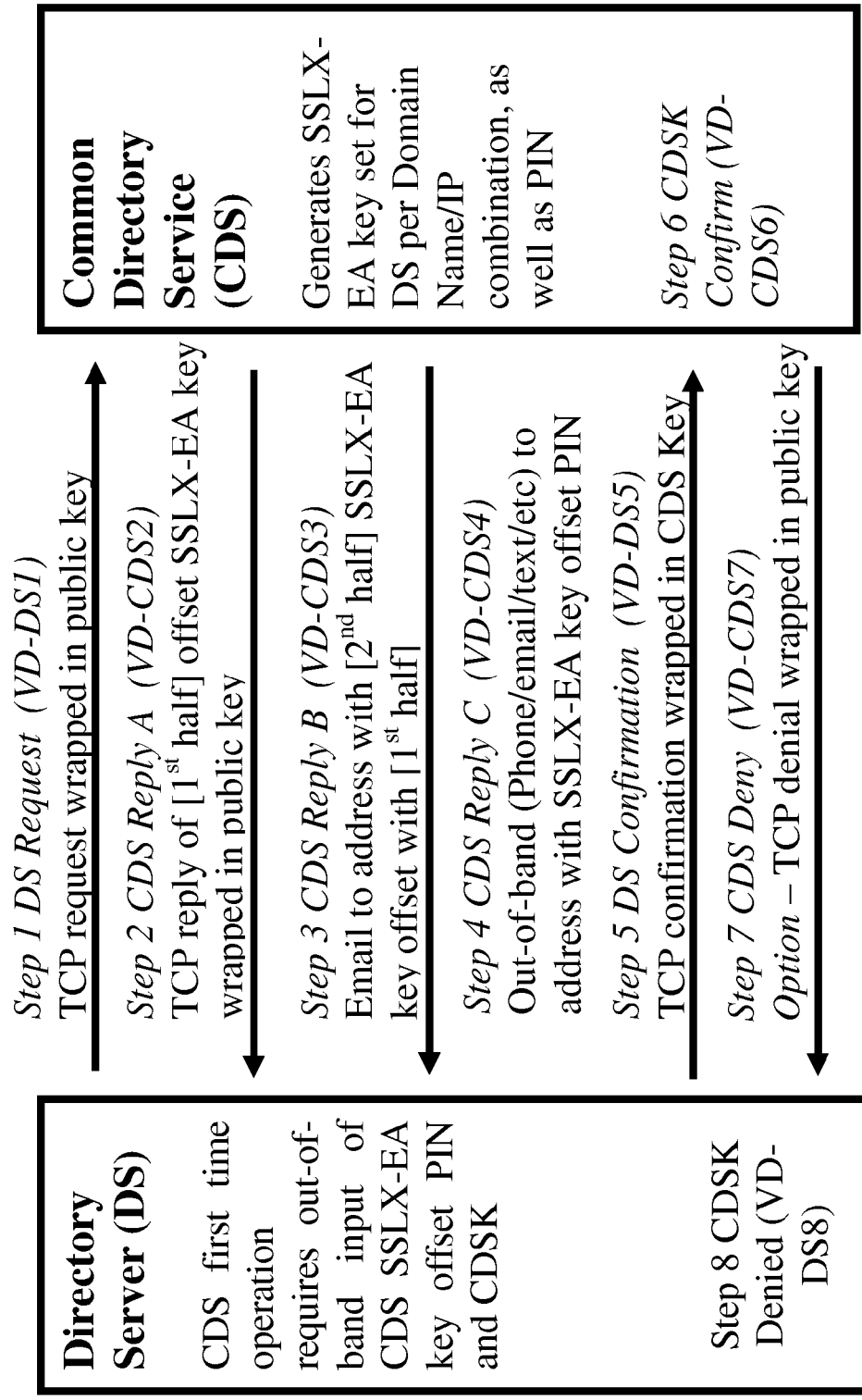
FIG. 1 depicts a block diagram of a verified common directory service setup according to one aspect of the present invention.

Referring to FIG. 1, the following describes an exemplary embodiment of operation of the Verified DS Set Up for any Directory Server to Common Directory Server. The DS first creates a public and private key pair, and sends an open request to the Common Directory Service (CDS) for a trusted SSLX-EA (Embedded Authentication) CDS Key (CDSK) to be wrapped in the public key (VD-DS1). This process is disclosed in detail in the '874 and '875 patents. The request has an Authentication Request (AR) value that identifies it as a VSU-DS (since a regular SSLX VSU can be performed at the CDS operating as a regular DS).

The AR value is for a specialized combination of both public key and email as well as a third additional out-of-band communication channel. The CDS will make three replies after generating the CDSK for this DS—one directly back to the DS (Reply A) with the $1^{st}$ half of the CDSK offset by a 4-6 digit hexadecimal SSLX-EA PIN and wrapped using the sent public key (VD-CDS2). The second reply (Reply B) is in email to the email address specified in the AR with the $2^{nd}$ half of the CDSK offset by the $1^{st}$ half (VD-CDS3) and the third reply (Reply C) is to a phone, email, text or some other out-of-band channel specified in the AR with the SSLX-EA offset PIN (VD-CDS4).

The DS will allow input of the two halves of the CDSK, as well as the offset PIN, and perform first a SSLX-EA offset adjustment of the $1^{st}$ half of the unwrapped public key half of the CDSK using the PIN, and then use that $1^{st}$ half to perform a SSLX-EA offset adjustment to the $2^{nd}$ half of the CDSK. After generating the entire CDSK, it will be stored in a specialized VSU-DS location. In order to finalize the CDS verification set up, a confirmation TCP message will be sent to the CDS wrapped in the new CDSK (VD-DS5). The CDS will use the CDSK to decrypt the confirmation message (VD-CDS6). If it is not confirmed, and the sent values don't equal the calculated values, then the CDS will send a "denied" message back to the DS wrapped in the public key (VD-CDS7). The DS will then decrypt the denied message, and remove the CDS from the VSU-DS location (VD-DS8). In order to perform Real Time Trust communication through the CDS, the VSU-DS must be successfully performed.

After a successful VSU-DS, the DS will use the CDSK in Authentication Handshakes to other SSLX-supported DSs through the CDS.

CDS Authentication Handshake (AH-CDS)

Operation

Figure 2:
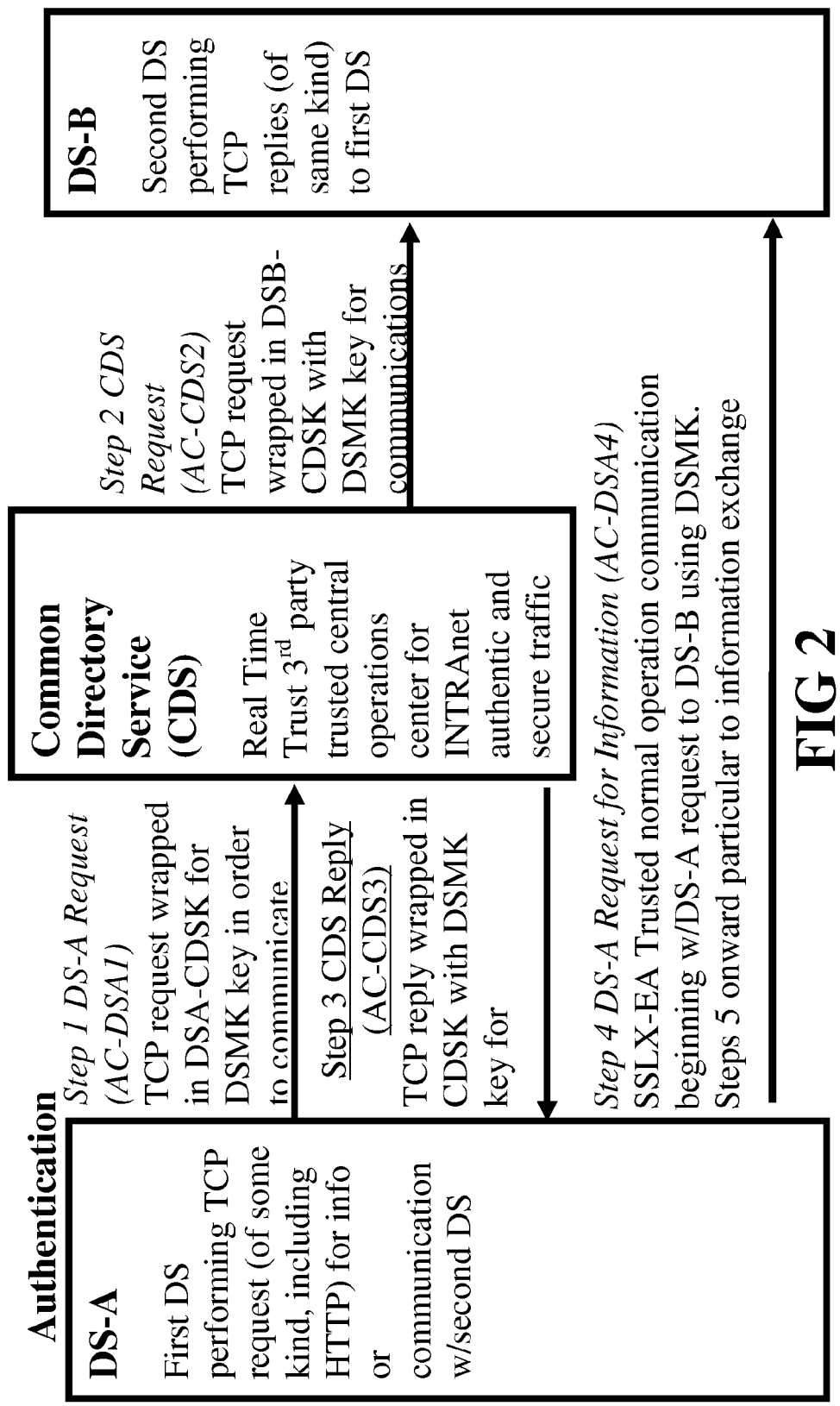
FIG. 2 depicts a block diagram of a common directory service authentication handshake according to another aspect of the present invention.

Referring to FIG. 2, the following describes an exemplary embodiment of an Authentication Handshake for Real Time Trust using the Common Directory Service. The CDS Authentication Handshake (AH-CDS) occurs when a DS (DS-A) wants to communicate w/another DS (DS-B). DS-A sends a request to the CDS using its CDSK in an SSLX-EA communication to obtain a DS Session Master Key (DSMK) to use for SSLX communication w/DS-B (AC-DSA1). The request has a CDS Authentication Request value that indicates to the CDS which DS with which it wishes to communicate. The CDS will make two replies after generating the DSMK for this DS—one to DS-B with the DSMK for the session w/DS-A wrapped in an SSLX-EA message using its CDSK (AC-CDS2); and the other back to DS-A with the DSMK wrapped using its CDSK (AC-CDS3). DS-B will await the next communication w/DS-A because DS-A initiated this requested session. DS-A will use any pre-established information exchange process w/DS-B, both of which will use the Real Time Trust shared DSMK key for this session (AC-DSA4).

Normal Operation (Trusted)

Upon initially performing a VSU-CDS to register for INTRAnet Real Time Trust across any public entity, then any DS information center can perform a CDS Authentication Handshake (AH-CDS) in real time requesting secure communication with any other registered public DS and then communicate using the SSLX DSMK just as any SSLX entity communicates using mutual authentication and data security in trusted mode. The specifics of that communication are detailed in the existing patents.

Real Time Trust Public Verification Communication

For each and any entity in SSLX, they will be able to send an open HTTP request to any public SSLX DS, the CDS and the Public Authority (PA) for connection information regarding any DS or the CDS. Any Browser, Web Server and/or DS will be able to publicly verify the current SSLX standing (last VSU date, VSU types, etc.) and current connection information (IP Address, public contact info, SMK or DSMK key life, etc.) of any DS or the CDS and their SSLX standing and information as held by the CDS or PA. This completes the circle of Real Time Trust as outlined in the original SSLX patents and reference architecture guide: any SSLX entity can verify any SSLX connection in real time.

What is claimed is:

1. A method for performing authenticated communication in a public network comprising:
sending an open request from a directory server to a common directory server for a first key, said first key being a trusted embedded authentication common directory service key wrapped in a public key of a public-private key pair, wherein the open request includes an authentication request value that identifies the open request as a verified setup directory service, the public key, an email address and a specified third additional out-of-band communication channel;
sending by the common directory server a first reply of three replies after generating the first key, said first reply being sent directly back to the directory server with a first half of the first key offset by a unique value and wrapped using the public key;
sending a second reply of the three replies via email to the email address, said second reply including a second half of the first key offset by the first half of the first key; and
sending a third reply of the three replies to the specified third additional out-of-band channel, said third reply including the unique value;
combining the first half of the first key and the second half of the first key to form the first key using the offset specified by the unique value;
storing the first key in a predetermined location in the directory server;
sending by the directory server a confirmation message wrapped in the first key to the common directory server; and
decrypting by the common directory server the confirmation message using the first key, said confirmation message including a sent value.

2. The method according to claim 1, further comprising:
creating by the directory server the public-private key pair, which includes the public key and a private key.

3. The method according to claim 1, further comprising:
sending a denied message wrapped in the public key back to the directory server by the common directory server if the sent value does not equal a value calculated by the common directory server using the first key during the decrypting.

4. The method according to claim 3, further comprising:
decrypting by the directory server the denied message using the public key; and
removing by the directory server the first key from the predetermined location in the directory server.

5. The method according to claim 1 further comprising:
using by the directory server the first key in all subsequent authentication handshakes through the common directory service with other directory servers having keys obtained from the common directory server in a similar manner.

6. The method according to claim 1, wherein the specified third additional out-of-band channel includes a telephone number to which to send a computer generated voice message.

7. The method according to claim 1, wherein the specified third additional out-of-band channel includes a telephone number to which to send a text message.

8. The method according to claim 1, wherein the specified third additional out-of-band channel includes an email address to which to send an electronic message.

9. The method according to claim 1, wherein the specified third additional out-of-band channel includes a specific social media destination address such as a specific facebook page or twitter account to which to send an electronic message.

10. A method for performing real-time authentication between a first directory server and a second directory server, the first directory server having obtained a first key from a common directory server and the second directory server having obtained a second key from the common directory server comprising:
sending by the first directory server a first request to the common directory server wrapped in the first key in an SSLX-EA communication to obtain a first directory server session master key to use in subsequent communication with the second directory server, wherein the first request includes a first authentication request value that indicates to the common directory server with which one of a plurality of directory servers that the first directory server wishes to communicate;
generating the first directory server session master key by the common directory server;
sending by the common directory server a first of two replies after generating the first directory server session master key, wherein the first reply is sent to the second directory server with the first directory server session master key wrapped in an SSLX-EA message using the second key; and
sending a second reply of the two replies back to the first directory server with the first directory server session master key wrapped in an SSLX-EA message using the first key.

11. The method according to claim 10, further comprising:
wrapping all communications with the second directory server by the first directory server with the first directory server session master key in an SSLX-EA message.

12. The method according to claim 10, further comprising:
unwrapping all communications from the first directory server by the second directory server using the first directory server session master key.

13. A method for performing authenticated communication in a public network comprising:
sending by a first directory server a first open request to a common directory server for a first key, said first key being a trusted embedded authentication common directory service key wrapped in a first public key of a first public-private key pair of the first directory server, wherein the first open request includes a first authentication request value that identifies the first open request as a verified setup directory service, the first public key, a first email address and a first specified third additional out-of-band communication channel;
sending to the first directory server by the common directory server a first reply of three replies after generating the first key, said first reply being sent directly back to the first directory server with a first half of the first key offset by a first unique value and wrapped using the first public key;
sending a second reply of the three replies via email to the first email address, said second reply including a second half of the first key offset by the first half of the first key;
sending a third reply of the three replies to the first specified third additional out-of-band channel, said third reply including the first unique value;

combining by the first directory server the first half of the first key and the second half of the first key to form the first key using an offset specified by the first unique value;

sending by the first directory server a first confirmation message wrapped in the first key to the common directory server;

sending by a second directory server a second open request to a common directory server for a second key, said second key being a trusted embedded authentication common directory service key wrapped in a second public key of a second public-private key pair of the second directory server, wherein the second open request includes a second authentication request value that identifies the second open request as a verified setup directory service, the second public key, a second email address and a second specified third additional out-of-band communication channel;

sending to the second directory server by the common directory server a first reply of three replies after generating the second key, said first reply being sent directly back to the second directory server with a first half of the second key offset by a second unique value and wrapped using the second public key;

sending by the common directory server to the second directory server a second reply of the three replies to the second directory server via email to the second email address, said second reply to the second directory server including a second half of the second key offset by the first half of the second key;

sending a third reply of the three replies to the second directory server to the second specified third additional out-of-band channel, said third reply to the second directory server including the second unique value;

combining by the second directory server the first half of the second key and the second half of the second key to form the second key using an offset specified by the second unique value;

sending by the second directory server a second confirmation message wrapped in the second key to the common directory server;

sending by the first directory server a first request to the common directory server wrapped in the first key in an SSLX-EA communication to obtain a first directory server session master key to use in subsequent communication with the second directory server, wherein the first request includes a first authentication request value that indicates to the common directory server with which one of a plurality of directory servers that the first directory server wishes to communicate;

generating the first directory server session master key by the common directory server;

sending by the common directory server a first of two replies after generating the first directory server session master key, wherein the first reply is sent to the second directory server with the first directory server session master key wrapped in an SSLX-EA message using the second key; and sending a second reply of the two replies back to the first directory server with the first directory server session master key wrapped in an SSLX-EA message using the first key.

14. The method according to claim 13, further comprising:
wrapping all communications with the second directory server by the first directory server with the first directory server session master key in an SSLX-EA message.

15. The method according to claim 14, further comprising:
unwrapping all communications from the first directory server by the second directory server using the first directory server session master key.

16. The method according to claim 15, wherein the first or second specified third additional out-of-band channel includes a telephone number to which to send a computer generated voice message.

* * * * *